(12) United States Patent
Sø et al.

(10) Patent No.: US 11,457,321 B2
(45) Date of Patent: *Sep. 27, 2022

(54) HEARING AID DEVICE HAVING WIRELESS COMMUNICATION

(71) Applicant: Oticon A/S, Smørum (DK)

(72) Inventors: Rune Sø, Smørum (DK); Morten Thougaard, Smørum (DK); Stefan Schaub, Berne (CH)

(73) Assignee: OTICON A/S, Smørum (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/229,335

(22) Filed: Apr. 13, 2021

(65) Prior Publication Data

US 2021/0235204 A1 Jul. 29, 2021

Related U.S. Application Data

(63) Continuation of application No. 16/739,436, filed on Jan. 10, 2020, now Pat. No. 11,006,227, which is a continuation of application No. 15/892,662, filed on Feb. 9, 2018, now Pat. No. 10,575,107.

(30) Foreign Application Priority Data

Feb. 9, 2017 (EP) .................................... 17155380

(51) Int. Cl.
| | |
|---|---|
| *H04R 25/00* | (2006.01) |
| *H02J 50/10* | (2016.01) |
| *H02J 7/02* | (2016.01) |

(52) U.S. Cl.
CPC ......... *H04R 25/554* (2013.01); *H04R 25/602* (2013.01); *H04R 25/65* (2013.01); *H02J 7/025* (2013.01); *H02J 50/10* (2016.02); *H04R 2225/31* (2013.01); *H04R 2225/49* (2013.01); *H04R 2225/51* (2013.01)

(58) Field of Classification Search
CPC ...... H05R 25/00; H05R 25/55; H05R 25/558; H05R 25/60; H05R 25/65
USPC .................. 381/312, 314–315, 322–324, 331
See application file for complete search history.

(56) References Cited

U.S. PATENT DOCUMENTS

| | | | |
|---|---|---|---|
| 3,659,056 A | 4/1972 | Morrison et al. | |
| 6,157,728 A | 12/2000 | Tong et al. | |
| 7,043,041 B2 | 5/2006 | Svajda et al. | |
| 7,349,741 B2 | 3/2008 | Maltan et al. | |
| 8,213,657 B2 | 7/2012 | Makela et al. | |
| 10,178,483 B2 | 1/2019 | Teran et al. | |
| 2006/0039577 A1 | 2/2006 | Sanguino et al. | |
| 2006/0093174 A1 | 5/2006 | Niederdrank et al. | |
| 2007/0183614 A1 | 8/2007 | Kasztelan et al. | |
| 2008/0205678 A1 | 8/2008 | Boguslavskij et al. | |
| 2008/0212812 A1 | 9/2008 | Chan et al. | |
| 2009/0231211 A1 | 9/2009 | Zweers | |
| 2012/0213395 A1* | 8/2012 | Rosenkranz | H04R 25/00 381/317 |

(Continued)

*Primary Examiner* — Suhan Ni
(74) *Attorney, Agent, or Firm* — Birch, Stewart, Kolasch & Birch, LLP

(57) ABSTRACT

A hearing aid device having a telecoil and a power consuming element is disclosed. The hearing aid device further comprises an at least partial loop in the power supply line, which at least partial loop provides a magnetic signal that at least attenuates or cancels noise induced from the power draw of the power consuming component.

18 Claims, 2 Drawing Sheets

(56) References Cited

U.S. PATENT DOCUMENTS

2015/0264478 A1* 9/2015 Aubreville ........... H04R 25/407
381/317
2016/0134960 A1* 5/2016 Den Hartog ........... H04R 25/55
381/323

* cited by examiner

HEARING AID DEVICE HAVING WIRELESS COMMUNICATION

This application is a Continuation of application Ser. No. 16/739,436, filed on Jan. 10, 2020, which is a Continuation of application Ser. No. 15/892,662, filed on Feb. 9, 2018 (now U.S. Pat. No. 10,575,107, issued Feb. 25, 2020), which claims priority under 35 U.S.C. § 119(a) to Application No. 17155380.3, filed in Europe on Feb. 9, 2017, all of which are hereby expressly incorporated by reference into the present application.

FIELD

The present disclosure relates to hearing aid devices having wireless communication, such as wireless reception. The reception may be at audio frequencies, such as in a telecoil system. The disclosure relate to hearing aid devices having an inductive communication system and a power consuming component that may draw power from a power source at intervals corresponding to audio frequencies. Such systems could be in a hearing aid device comprising both an RF system and an inductive system, such as a Bluetooth-based system, currently such systems most often operate at 2.4 GHz, and a magnetically based system, e.g. a telecoil and/or other inductive communication system. Also, a component such as a speaker in the hearing aid device housing may be operated at audio frequencies.

BACKGROUND

As different kinds of communication between a hearing aid device and an external unit is often of benefit there is a need to provide a hearing aid device being capable of supporting a range of different modes of communication. However, when different modes of communication are used there is a risk that, due to various reasons, signals from one communication system induce noise in the other system. Further, there may be interference from one communication system to the other, where the interference arises from parts of the first system that was not intended to radiate, e.g. from currents in parts not being the antenna. Such currents could cause magnetic coupling to parts of the other communication systems. Still further, large current draws from any part of a hearing aid device could cause magnetic coupling to parts of any of the communication systems in the hearing aid device.

Further, in so-called behind-the-ear configurations where a housing is configured to be positioned behind the ear of a wearer, sound generated from a speaker in the housing is guised to the ear canal of the wearer through a tube extending from the housing to an ear piece wherefrom it is delivered to the ear canal. When the speaker is operated, the current draw may be significant and magnetic signals at audio frequency may be emitted which could cause noise in the signal received in the telecoil.

Therefore, there is a need to provide a solution that addresses at least some of the above-mentioned problems. The present disclosure provides at least an alternative to the prior art.

SUMMARY

According to an aspect a hearing aid device is provided. The hearing aid device may comprise a housing configured to be positioned on or at an ear of a user; the housing extending in a longitudinal direction. This could for instance be a so-called behind-the-ear hearing aid, where a speaker is included in the housing and sound guided out via a tube, or a receiver-in-the-ear hearing aid, where a speaker is positioned in the ear canal. Further alternatively the housing may be an in-the-ear style, where all or most of the housing is positioned in or at the ear canal.

The hearing aid device may comprise a power source arranged in the housing and a power connector configured to establish electrical contact with the power source, the power connector extending along a first power connector axis. The power source may be replaceable or replenishable. The hearing aid device may comprise a first power consuming component arranged on a first substrate, where the first substrate arranged is in the housing. The hearing aid device may comprise the first power consuming component being powered by said power source via said power connector. The hearing aid device may comprise a telecoil arranged in the housing at a distance from said first power consuming component. The telecoil is configured to receive inductive communication at a first frequency, which frequency is at audio frequencies. The telecoil is often used for receiving microphone signals from various sources such as churches, concert halls, cinemas, universities, some taxi cabs, e.g. found in London and New York City, airports and train stations, museums (for guided tours). The telecoil often comprises a small wire coiled around a rod located inside the hearing aid device and pick up magnetic signals, which are then streamed as sound through the output transducer, i.e. the speaker. The hearing aid device may comprise a conductive supply line that may extend between the power connector and the first power consuming component, and a part of the conductive supply line may then be formed or shaped so as to form at least part of a loop. The loop, or at least partly loop, may be arranged so that when the first power consuming component draws power from the power source a magnetic field originating from the power connector due to the power draw is at least reduced at the telecoil by a second magnetic field created at the at least partial loop in the conductive path. As the power draw creates a current one place in the power supply, e.g. at the power connector, a magnetic field is generated almost instantaneously in the loop and the two fields, if not cancel out, at least the second field reduce the first field generated due to the power draw. Preferably, a part of the conductive supply line is formed on a substrate, including the part have a geometry as at least part of a loop. The part, i.e. the part formed as a loop, of the supply line is configured to emit a second magnetic field in response to the first power consuming component drawing power from the power source, so that a magnetic field originating from the power connector, due to the power draw, is at least reduced at the telecoil by the second magnetic field. This could be seen as a passive compensation as it does not require an active action e.g. in a noise cancelation algorithm applied to a signal from the sensitive component. The part may be configured to do this owing to the size of the at least partial loop shape and/or size, and/or the position of the at least partial loop in relation to the telecoil and/or other sensitive component. The at least partial loop is located somewhere in the supply line between the battery and the power consuming component, and preferably not around the component. As mentioned herein the supply line may extend over and/or through several substrates and may include wires and/or other conductive paths. By not placing the at least partial loop around the component it is intended that more possibilities are available for designing the optimal compensation at areas or volumes within the hearing aid where sensitive components are present. This is, as outlined herein, especially important when dealing with components such as a telecoil. It is more especially important when components are subjective to noise at frequencies falling within a range corresponding to operation frequencies of other components. Thus, during use, a first magnetic field will be emitted due to the current draw of the power consuming component, this will be a disturbing field at the telecoil, or other sensitive component, this field may be e.g. emitted from a connection arm at the battery. The at least partial loop, during use, will create a second magnetic field which will also be present at the telecoil. The resultant magnetic field, from the first and the second magnetic fields, at the telecoil, will be substantially lower than the first magnetic field alone, thus, the second magnetic field will compensate for the disturbance from the first magnetic field. The telecoil will then be able to sense the telecoil field with less noise from the first magnetic field than in situations where the second magnetic field would not be present. The at least partial loop may be formed on a substrate close to, e.g. in the vicinity of, the disturbing, power consuming component, but preferably not directly around the power consuming component.

The first power consuming component may be or comprise a communication system. This could for instance be a Bluetooth system, or other similar system operated at carrier high frequency, where the communication system draw a substantially amount of power from the battery at intervals, which may cause generation of fields at a frequency corresponding to the audio frequency sensed by the telecoil. It could for instance be that the system commences to send or receive a data package, or series of packages, around 400 times each second, this could then cause or create a disturbing magnetic signal with a frequency around 400 Hz to disturb reception at the telecoil. The communication system may be connected to an antenna for transmitting and/or receiving electromagnetic radiation at a first frequency, e.g. 2.4 GHz. The first power consuming component may (alternatively or additionally) be or comprises a speaker arranged in the housing. Thus, several components in the hearing aid may be source of disturbances in other components. Especially when such a speaker is operated at high power levels, the power draw to the speaker may be substantial, and as the speaker is located in the housing the electric field generated by the power draw may interfere with the telecoil. In both cases, the at least partial loop will help reduce the interfering magnetic field in or at the telecoil. A shielding conductor, e.g. in the form of a wire or conductive path, may be included at the supply line directly in the vicinity of the receiver, i.e. the speaker. This may help reduce emission originating from the supply lines and/or the speaker especially during periods where the current supply to the speaker is high.

The power connector may be orientated in the housing so that the first power connector axis extends in a direction substantially parallel to the longitudinal axis of the housing. The orientation of the power connector may play a substantial role in the resulting disturbing signal, depending also on the orientation of the telecoil. The orientation of the telecoil may be governed by e.g. space limitations, as hearing aid devices are small, compact devices with an ever-increasing requirement to be less and less visible when mounted at the ear of the user/wearer.

The first communication system may be included in an integrated circuit, and a part of the conductive supply line may be shaped similar to the outline of the integrated circuit component. That part of the supply line is preferably formed on a substrate, e.g. a printed circuit board. The similarly shaped part may be positioned at the integrated circuit component, or may be positioned elsewhere on a substrate in the hearing aid.

The supply line may be formed, or span, over a multitude of connected substrates. In some instances at least one of the multiple substrates may be orientated perpendicular to the first substrate. The supply line may be formed over or span several layers in one or more substrates.

The telecoil may be arranged in the housing so that the longitudinal axis of the telecoil is substantially parallel to the first substrate. The telecoil may be arranged so that the longitudinal axis of the telecoil is substantially parallel to the direction of the power connector. The at least partial loop may form or define a loop plane, where the loop plane may be arranged or configured so that the resultant magnetic field counter the disturbing magnetic field at the telecoil. The telecoil may be arranged so that the longitudinal axis of the telecoil is substantially perpendicular to the loop plane defined by the at least partial loop. The telecoil may be arranged so that the longitudinal axis of the telecoil is substantially parallel to the loop plane defined by the at least partial loop. The telecoil may be arranged so that the longitudinal axis of the telecoil defines an angel of around 10 to 40 degrees to the loop plane defined by the at least partial loop, such as around 15 degrees from perpendicular.

The at least partial loop may be arranged at or around the periphery of the first power consuming component, such as in or on the substrate carrying the first power consuming component. Placing the at least partial loop near the power consuming component may be advantageous in that the magnetic signal from the loop may be less powerful compared to the disturbing signal that needs to be cancelled or reduced. The at least partial loop may be arranged closer to the telecoil than the power consuming component.

The power source may be a cylindrically shaped battery, and wherein the center axis of the battery, when arranged in the housing, is orthogonal to the longitudinal direction of the housing. The battery may be positioned in a battery drawer in the housing. The power source may be rechargeable and/or replaceable. The hearing aid device may include circuitry for controlling a recharging process of the power source. The hearing aid may be configured to recharge the power source via a wireless or wired connection to an outside power source.

The hearing aid device may further comprise a second power connector configured to establish electrical contact with the power source, wherein the power connector and the second power connector may then be arranged so that they contact different sides of the power source, such as opposite or adjoining sides of the power source.

The second power connector may extend along a second power connector axis that may be perpendicular to the power connector axis. A part of the disturbing magnetic field may arise from both the power connector and the second power connector.

A part of the supply line may be raised compared to the first substrate. This could be an additional, or second, part of the supply line. This second, raised, part could then create or emit a second magnetic field in response to the current draw. The resultant field would then, at least, comprise the disturbing field and the two compensation fields, namely from the partial loop and from the raised part. In such a configuration the raised part could be constituted by e.g. a wire, a thread, a flexible material including a conductor, a coil or the like.

The raised part of the supply line may be configured so that the at least partly loop surrounds at least part of the first power consuming component. The raised part could for instance be configured to lie at the circumference of the power consuming element.

The features and aspects mentioned above may be combined either individually or collected.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
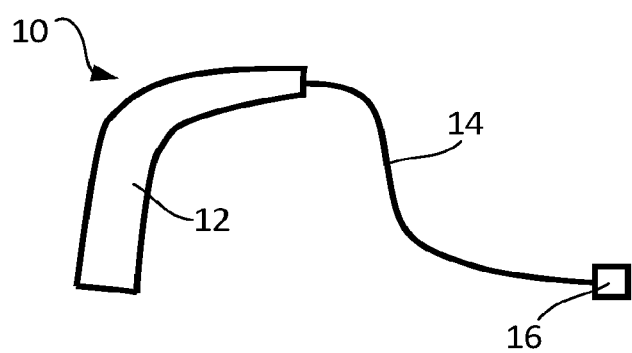
FIG. 1 schematically illustrates a hearing aid device configured to be positioned behind the ear of a wearer.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing aid device, may include a hearing aid that is generally adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing aid device" may further refer to a device such as an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing aid device is adapted to be worn in any known way. This may include i) arranging a unit of the hearing aid device behind the ear with a tube leading air-borne acoustic signals into the ear canal or with a receiver/loudspeaker arranged close to or in the ear canal such as in a Behind-the-Ear type hearing aid, and/or ii) arranging the hearing aid device entirely or partly in the pinna and/or in the ear canal of the user such as in a In-the-Ear type hearing aid or In-the-Canal/Completely-in-Canal type hearing aid, or iii) arranging a unit of the hearing aid device attached to a fixture implanted into the skull bone such as in Bone Anchored Hearing Aid or Cochlear Implant, or iv) arranging a unit of the hearing aid device as an entirely or partly implanted unit such as in Bone Anchored Hearing Aid or Cochlear Implant.

A "hearing system" refers to a system comprising one or two hearing aid devices, and a "binaural hearing system" refers to a system comprising two hearing aid devices where the devices are adapted to cooperatively provide audible signals to both of the user's ears. The hearing system or binaural hearing system may further include auxiliary device(s) that communicates with at least one hearing aid device, the auxiliary device affecting the operation of the hearing aid devices and/or benefitting from the functioning of the hearing aid devices. A wired or wireless communication link between the at least one hearing aid device and the auxiliary device is established that allows for exchanging information (e.g. control and status signals, possibly audio signals) between the at least one hearing aid device and the auxiliary device. Such auxiliary devices may include at least one of remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing aid device. The remote control is adapted to control functionality and operation of the at least one hearing aid devices. The function of the remote control may be implemented in a SmartPhone or other electronic device, the SmartPhone/electronic device possibly running an application that controls functionality of the at least one hearing aid device.

In general, a hearing aid device includes i) an input unit such as a microphone for receiving an acoustic signal from a user's surroundings and providing a corresponding input audio signal, and/or ii) a receiving unit for electronically receiving an input audio signal. The hearing aid device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, filter banks etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing aid devices, the output unit may include one or more output electrodes for providing the electric signals such as in a Cochlear Implant.

FIG. 1 schematically illustrates a hearing aid device 10, or at least the internal components thereof. The hearing aid device comprises a housing 12 configured to be positioned at the ear of a user. Here the housing 12 is configured to be positioned in the area or space between the user's pinna and skull, also often designated as behind-the-ear. A connector 14 connects the housing 12 to an in-the-ear element 16. The connector 14 may be an air conducting tube guising airborne acoustic signals from a speaker in the housing 12 to the in-the-ear element 16. Alternatively, the connector 14 may comprise electrical conductor guiding electric signals to the in-the-ear element 16, which then comprises a speaker that converts the electrical signal to an acoustic signal that is then presented to the user's ear canal. The housing 12 could be made from a material that is resistant to the environment at the ear of the user, e.g. able to protect the components from sweat, cerumen, oil from the skin, and even rain and/or other environmental influences. Further, the housing or parts thereof such as openings in the housing, could be protected by a coating, such as a hydrophobic coating or the like.

Figure 2:
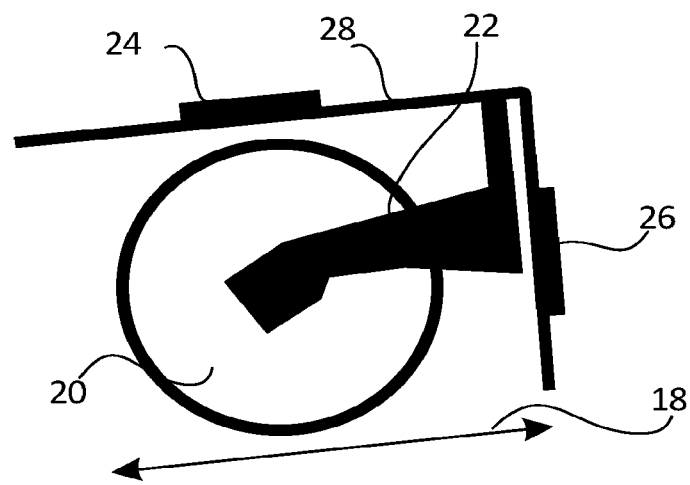
FIG. 2 schematically illustrates two substrates carrying electronic components and a power source.

FIG. 2 schematically illustrates internal components of a hearing aid device, similar to the device illustrated in FIG. 1. In FIG. 2 the housing configured to be positioned on or at an ear of a user is not illustrated. The housing, however, extends in a longitudinal direction, indicated by the axis or double arrow 18. This direction 18 could allow for the housing to have a suitable shape so that the housing may be situated in the area between the pinna and the skull of the user, as outlined in the description above.

The hearing aid deice illustrated in FIG. 1 and the one in FIG. 2 could either be a behind-the-ear device or a receiver-in-the-ear device, depending on the placement of a speaker unit as described above.

The hearing aid device comprises a power source 20. The power source 20 is here arranged in the housing, but may alternatively be arranged in a unit attachable to the housing, further alternatively the power source could be distributed between several parts of the hearing aid device. The power source 20 may be replenishable, such as a rechargeable battery, or a replaceable battery. A coil in the hearing aid may be used to generate an appropriate power signal which may be used for a recharge process. This could for instance be a near-field magnetic coil arranged in the housing. The near-field magnetic coil or antenna may thus perform at least two different functions, e.g. at different points in time. The near-field magnetic antenna may for instance be arranged in an area or volume between the batter and an end of the housing of the hearing aid. This could allow the near-field magnetic antenna to be placed so that when applying a recharge signal to the coil as few as possible currents are induced in other parts of the hearing aid, i.e. the charge signal does not heat parts of the hearing aid that is not intended to receive the power signal. The power source 20 is arranged in a compartment (not shown), also denoted a battery compartment, substantially forming part of a battery drawer, especially when the battery is replaceable. In such an arrangement, the battery drawer is pivotally connected to at least a part of the housing. In the case that the battery is rechargeable, the battery drawer could be dispensed with, e.g. the battery could be arranged so that it is not accessible without disassembling the housing completely.

Among the inner components of the hearing aid device a power connector 22 is configured to establish electrical contact between the power source 20 and electronics 24 and 26 in the hearing aid. The power connector 22 is also referred to as a battery spring. In FIG. 2, the power connector 22 extends generally along a first power connector axis. In FIG. 2, the power connector 22 is generally orientated along, i.e. parallel to, the longitudinal direction of the hearing aid device housing indicated by the double arrow 18. The length of the power connector 22 is less than the diameter of the power source 22.

In the hearing aid, a first power consuming component, here the electronic component 26, is arranged on a first substrate 28. Further, in the assembled hearing aid device, the first substrate 28 is arranged in the housing 12. The first power consuming component 26 is configured so as to be powered by the power source 20 via the power connector 22. The path from the power source 20 to the power consuming component 26 may span several parts of the inner components.

The conductive path, i.e. power line, from the power source 20 to the power consuming component 26 includes a partial loop. The power draw from the power source 20 to the power consuming element through the partial loop causes a magnetic field to be established. Further, a disturbing magnetic field is created by the same current draw in different parts of the supply line. Due to the nature of the power consuming component 26 the current is drawn at frequencies that correspond to the audio frequencies used in the communication with the telecoil, and the disturbing signal is therefore audible in the output from the telecoil unless something is done to compensate for the noise. Owing to the orientation, size and position, the partial loop creates a magnetic field that supresses, compensate or attenuates the disturbing signal at the telecoil. The result is that the magnetic induction signal received at the telecoil is not subjected to a significantly disturbing signal, and the desired audio signal from a transmitter is received with a lower disturbance than if the partial loop was not present. The partial loop may be positioned on any of the substrates in the hearing aid device.

The size, e.g. measured as the largest size of the loop or diameter, of the at least partial loop may be in the same range of the size of the power source but could be smaller or larger.

Figure 3:
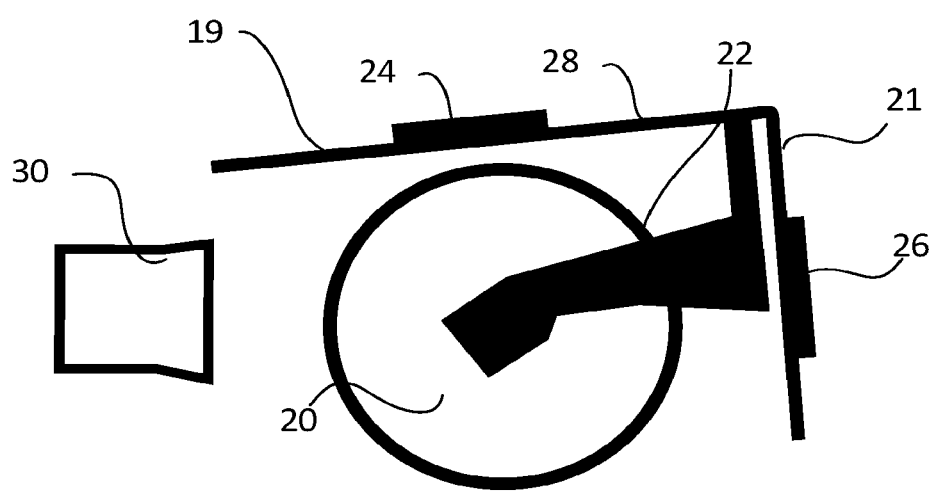
FIG. 3 schematically illustrates two substrates carrying electronic components and a power source and a telecoil.

In FIG. 3, the hearing aid device 10 comprises a communication system, here telecoil 30, arranged in the housing at a distance from the first power consuming component 26. Here the first power consuming component 26 is a Bluetooth system, i.e. an ASIC configured to perform communication according to the Bluetooth protocol. In general, such a Bluetooth system 26 may be configured to send and/or receive information wirelessly to/from a remote source, such as a mobile phone, auxiliary device, streaming device streaming audio from e.g. a television or the like. Other protocols may of cause be used, as well as frequencies other than 2.4 GHz, which is the most common carrier frequency for Bluetooth systems. The power consuming element thus draw power at certain points in time, including the times when listening for communication from other units, commencing communication, performing communication, transmitting to other units etc.

The telecoil is configured to receive inductive communication radiation at a first frequency, such as around audio frequencies. The illustrated telecoil may receive an inductive signal from a system having a fixed transmitter, such as in a church, a cinema or other installation or as traditionally from a handset in a landline telephone. If both systems, i.e. telecoil and Bluetooth, are active at the same time, which is likely to occur as the Bluetooth system is inherently configured to e.g. maintain and establish contact with paired and (known and trusted) active devices in the vicinity, the power draw from the Bluetooth system, when drawn at intervals corresponding to audio frequencies, may cause interference at the telecoil if not properly compensated, such as by the at least partial loop as described above.

In the hearing aid device, a conductive supply line extends between the power connector and the first power consuming component, and a part of the conductive supply line is formed at the first substrate so as to form at least part of a loop. The loop may include more than one turn, such as two, three, or partial numbers such as one and a half, one and a quarter, or more, or be only partial, such as nearly complete, such as 90-99% complete. The at least partial loop may be established by straight lined conductors so that the loop is essentially a polygon.

The magnetic field from the partial loop will be in the range of 100 mA at a distance of around 5 mm from the loop, which could correspond to a point at or in the telecoil. In general resulting filed, i.e. the magnetic field being the combination of at least the disturbing field and the compensation field from the at least partial loop, should be perpendicular to the longitudinal axis of the telecoil, in this way current induced in the telecoil is minimized.

Figure 4:
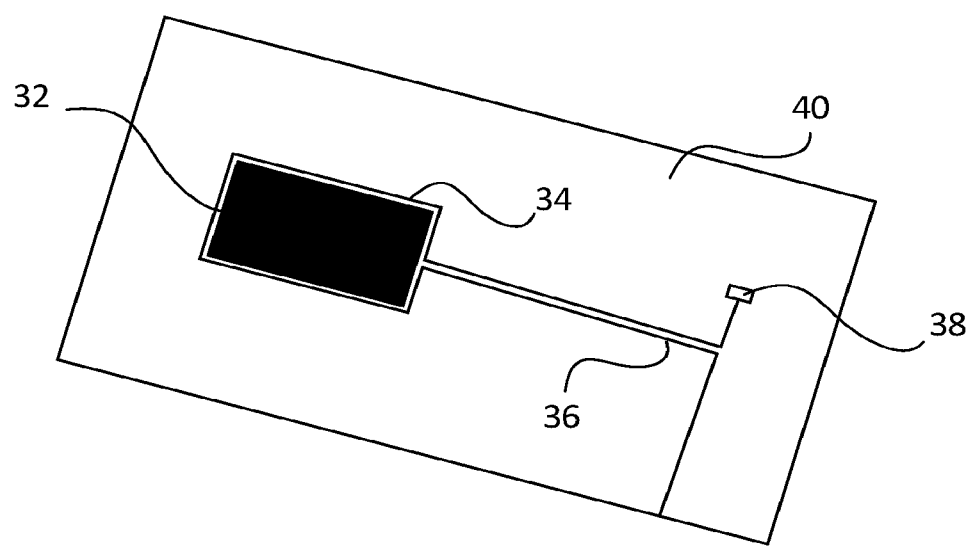
FIG. 4 schematically illustrates a substrate carrying a power consuming component and a supply line including a partial loop arranged at the power consuming component, FIG. 5 schematically illustrates a substrate carrying a power consuming element and a raised portion of a power supply line, and FIG. 6 schematically illustrates a substrate carrying a power consuming element and a second substrate carrying a raised portion of a power supply line.
Figure 5:
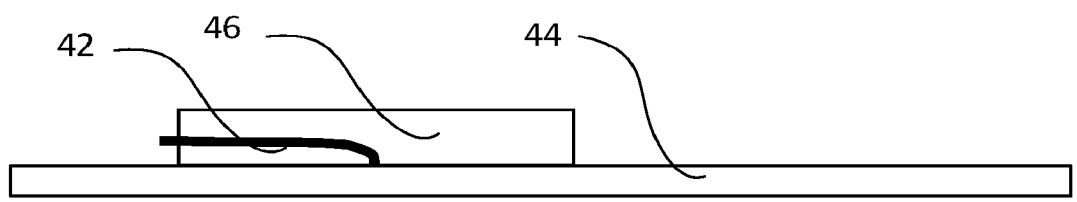
Figure 6:
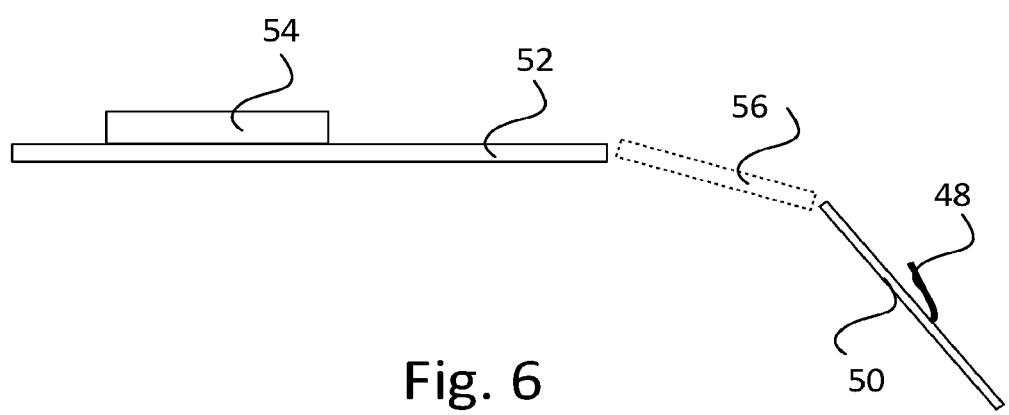

As illustrated in FIG. 4 a part of the power supply line 34 may be arranged at the contour of a first power consuming component 32 so that when the first power consuming component 32 draws power from the power source the radiation from the power connector and the power supply line 36 is at least reduced at the inductive element, i.e. the telecoil, of the communication system by a compensating magnetic field created by at least partial loop 34 in the conductive path. However, the at least partial loop 34 may be arranged elsewhere in the hearing aid housing. In FIG. 2 the at least partial loop is established on the vertical substrate. Further, the at least partial loop may be arranged as illustrated in FIG. 5 or FIG. 6. At the point 38 the power supply line 36 connects to other parts, such as other layers in the substrate 40.

As illustrated in FIG. 5 a part of the power supply line 42 may be raised relative to the substrate 44 and/or power consuming component 46. This could be achieved by e.g. a wire or conductor soldered at two ends to corresponding pads on the substrate 44. The raised part 42 will allow further adaptation of the resultant magnetic field. This could be useful if the substrate 44 is not orientated optimally relative to the orientation of the telecoil. The raised part 42 provides additional degrees of freedom for obtaining reduced noise at the telecoil. Further, the raised part 42 may be arranged around the power consuming component, which could prove especially useful when the power consuming component is a speaker unit, not illustrated. In such as case the raised part 42 could be arranged at least partly around the speaker unit. The raised part 42 could be used in combination with a loop structure formed in or on the substrate as described above. Here the raised part 42 is illustrated at the outer contour or periphery of the power consuming element 46. As illustrated in FIG. 6 a raised part 48 may be arranged at other locations than illustrated in FIG. 5, e.g. at a different substrate 50 than the substrate 52 carrying the power consuming element 54. In a further alternative, the substrate carrying the at least partial loop may be arranged parallel to a sidewall of the housing of the hearing aid. An optional additional, here intermediate, substrate 56 is provided between the two substrates 50, 52. Any additional substrate may be positioned with any orientation relation to the other substrates.

Further, referring again to FIG. 2, an at least partial loop may be formed on or in a substrate 19 different from the substrate 21 carrying the power consuming element 26. This allow an angle between the plane defined by the partial loop, e.g. a normal to the plane, and the lengthwise axis of the telecoil 30 to be chosen by the relation between the two substrates. The substrates may be arranged e.g. along the top part of the housing, such as at a bend of the housing so that the angle substantially corresponds to the bend. The angle between the telecoil and the loop may be in the range of 0 to 90 degrees, such as 10 to 80 degrees, such as around 10 degrees, such as around 20 degrees, such as around 45 degrees, such as around or precisely 90 degrees. Additional substrates may be present and possibly further number of at least partial loops.

In a further development, more than one at least partial loop may be arranged in the housing. This could be one at least partial loop on one substrate and a second at least partial loop on another substrate. The two at least partial loops need not be identical. The difference of the two loop could be the degree of windings, e.g. one could have a lesser number of loops than the other, or lesser degree of a full loop. The difference could also be the diameter of the loops. Still further, multiple at least partial loops may be formed on or in the same substrate, e.g. at two different locations along the length or width of the substrate.

In addition to the telecoil, another inductive communication system may be included in the hearing aid, such an inductive communication system could be advantageous when performing communication between two hearing aids, located at respective left and right sides of the head of the user.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A hearing aid device comprising:
   a housing configured to be positioned in, on or at an ear of a user,
   a power source arranged in the housing, a power connector configured to establish electrical contact with the power source, the power connector extending along a first power connector axis,
   a first power consuming component arranged on a first substrate, the first substrate arranged in the housing, the first power consuming component powered by said power source via said power connector,
   a noise sensitive component arranged in the housing at a distance from said first power consuming component, the noise sensitive component being sensitive to electromagnetic radiation, and
   a conductive supply line extending between the power connector and the first power consuming component,
   wherein a part of the conductive supply line has a geometry as at least part of a loop, and
   wherein the part of the conductive supply line is configured to emit a second magnetic field in response to the first power consuming component drawing power from the power source, so that a magnetic field originating from the power connector, due to the power draw, is at least reduced at the noise sensitive component by the second magnetic field.

2. The hearing aid device according to claim 1, wherein the noise sensitive component is arranged on the first substrate.

3. The hearing aid device according to claim 1, wherein the noise sensitive component is arranged on a second substrate.

4. The hearing aid device according to claim 1, wherein the raised part of the conductive supply line is raised and positioned at least partly around the first power consuming component.

5. The hearing aid device according to claim 1, wherein the first power consuming component comprises a communication system, and the communication system is connected to an antenna for transmitting and/or receiving electromagnetic radiation at a first frequency.

6. The hearing aid device according to claim 1, wherein the hearing aid further comprises a speaker arranged in the housing, the speaker being a power consuming component.

7. The hearing aid device according to claim 1, wherein the power connector is orientated in the housing so that the first power connector axis extends in a direction substantially parallel to a longitudinal axis of the housing.

8. The hearing aid device according to claim 1, wherein a first communication system is included in an integrated circuit, and a second part of the conductive supply line is shaped similar to the outline of the integrated circuit component.

9. The hearing aid device according to claim 1, wherein the conductive supply line spans over a multitude of connected substrates.

10. The hearing aid device according to claim 1, wherein the noise sensitive component is a coil arranged in the housing so that a longitudinal axis of the noise sensitive component is substantially parallel to the first substrate.

11. The hearing aid device according to claim 1, wherein the at least partial loop is arranged at the periphery of the first power consuming component, in or on the substrate carrying the first power consuming component.

12. The hearing aid device according to claim 1, wherein the power source is a cylindrically shaped battery, and wherein the center axis of the battery is orthogonal to the longitudinal direction of the housing.

13. The hearing aid device according to claim 12, wherein the second power connector extends along a second power connector axis that is perpendicular to the power connector axis.

14. The hearing aid device according to claim 1, further comprising a second power connector configured to establish electrical contact with the power source, wherein the power connector and the second power connector are arranged so that they contact different sides of the power source.

15. The hearing aid device according to claim 1, wherein a part of the conductive supply line is formed on a second substrate and has a geometry as at least part of a loop.

16. The hearing aid device according to claim 1, wherein the part of the conductive supply line is raised relative to the substrate and configured so that the at least partial loop surrounds at least part of the first power consuming component.

17. The hearing aid device according to claim 1, wherein the part of the conductive supply line is raised relative to the substrate and is constituted by a wire, a thread, or a flexible material including a conductor.

18. The hearing aid device according to claim 1, wherein a coil in the hearing aid is configured for providing a power signal to recharge the battery.

* * * * *